(12) United States Patent
Andrews et al.

(10) Patent No.: US 7,793,272 B2
(45) Date of Patent: Sep. 7, 2010

(54) METHOD AND APPARATUS FOR COMBINED EXECUTION OF NATIVE CODE AND TARGET CODE DURING PROGRAM CODE CONVERSION

(75) Inventors: Jonathan J. Andrews, Manchester (GB); Geraint North, Manchester (GB)

(73) Assignee: International Business Machines Corporation, Armonk, NY (US)

( * ) Notice: Subject to any disclaimer, the term of this patent is extended or adjusted under 35 U.S.C. 154(b) by 1307 days.

(21) Appl. No.: 11/273,111

(22) Filed: Nov. 14, 2005

(65) Prior Publication Data

US 2007/0006184 A1     Jan. 4, 2007

(30) Foreign Application Priority Data

Jun. 4, 2005    (GB) ................... 0511414.5

(51) Int. Cl.
*G06F 9/45* (2006.01)
*G06F 9/44* (2006.01)

(52) U.S. Cl. ............... 717/136; 717/127; 717/141; 717/151

(58) Field of Classification Search ......... 717/136–139, 717/151–153
See application file for complete search history.

(56) References Cited

U.S. PATENT DOCUMENTS

| | | | | | |
|---|---|---|---|---|---|
| 5,574,927 | A | * | 11/1996 | Scantlin | 712/41 |
| 6,044,220 | A | * | 3/2000 | Breternitz, Jr. | 717/139 |
| 6,081,665 | A | * | 6/2000 | Nilsen et al. | 717/116 |
| 6,199,202 | B1 | * | 3/2001 | Coutant et al. | 717/138 |
| 6,481,006 | B1 | * | 11/2002 | Blandy et al. | 717/139 |
| 6,502,237 | B1 | * | 12/2002 | Yates et al. | 717/136 |
| 6,721,941 | B1 | * | 4/2004 | Morshed et al. | 717/127 |
| 6,820,255 | B2 | * | 11/2004 | Babaian et al. | 717/151 |
| 7,137,105 | B2 | * | 11/2006 | Madsen et al. | 717/128 |

(Continued)

FOREIGN PATENT DOCUMENTS

EP    1 316 882    6/2003

(Continued)

OTHER PUBLICATIONS

"Programming With Objects: A Comparative Presentation of Object-Oriented Programming With C++ and JAVA" by A. C. Kak, 2003, Wiley Interscience, pp. 619, 626, and 628-630.*

(Continued)

*Primary Examiner*—Lewis A Bullock, Jr.
*Assistant Examiner*—Hang Pan
(74) *Attorney, Agent, or Firm*—Matthew B. Talpis (57) ABSTRACT

In program code conversion, particularly dynamic binary translation, subject code 17 is translated into target code 21 through a translator 19 for execution on a target processor 13. Selected portions of subject code, such as library functions SFuncA 172, are replaced by instead executing a portion of native code such as a native function NFuncA 282. The native function is native to the target processor 13. The method further includes executing a subject code portion such as a subject function SFuncB 173 in place of a native code portion such library function NFuncB 283. This reverse binding technique substitutes subject code for selected portions of the native code, particularly native library functions in order to keep control within the translator 19. This helps to maintain an accurate subject state in the translator 19, amongst other advantages.

43 Claims, 7 Drawing Sheets

U.S. PATENT DOCUMENTS

| | | | |
|---|---|---|---|
| 7,434,209 B2 * | 10/2008 | Brown et al. | 717/136 |
| 2002/0112227 A1 * | 8/2002 | Kramskoy et al. | 717/148 |
| 2004/0015972 A1 | 1/2004 | Barclay | |
| 2004/0243986 A1 * | 12/2004 | Nishiyama | 717/139 |
| 2005/0015781 A1 | 1/2005 | Brown et al. | |

FOREIGN PATENT DOCUMENTS

| | | |
|---|---|---|
| GB | 2 367 658 A | 4/2002 |
| WO | WO-00/22521 | 4/2000 |
| WO | WO-2005/008478 | 1/2005 |

OTHER PUBLICATIONS

Sun Microsystems Inc., The AWT Native Interface, Mar. 31, 2005, pp. 1-12. Retrieved on Jul. 13, 2006 from http://web.archive.org/web/20050313042535/http://java.sun.com/j2se/1.4.2/docs/guide/awt/1.3 /AWT_Native_Interface.html.

Sun Microsystems Inc., Java Native Interface Specification, Mar. 13, 2005, Chapters 1-5. Retrieved on Jul. 13, 2006 from http://web.archive.org/web/20050313005317/http://java.sun.com/j2se.1.4.2/docs/guide/jni/spec/jniTOC.html.

* cited by examiner

Fig. 10

METHOD AND APPARATUS FOR COMBINED EXECUTION OF NATIVE CODE AND TARGET CODE DURING PROGRAM CODE CONVERSION

CROSS REFERENCE TO RELATED APPLICATIONS

This application claims priority to United Kingdom Application No. 0511515.5, filed on Jun. 4, 2005.

BACKGROUND OF INVENTION

1. Field of the Invention

The present invention relates generally to the field of computers and computer software and, more particularly, to program code conversion methods and apparatus useful, for example, in code translators, emulators and accelerators which convert program code.

2. Description of Related Art

In both embedded and non-embedded CPUs, there are predominant Instruction Set Architectures (ISAs) for which large bodies of software exist that could be "accelerated" for performance, or "translated" to a myriad of capable processors that could present better cost/performance benefits, provided that they could transparently access the relevant software. One also finds dominant CPU architectures that are locked in time to their ISA, and cannot evolve in performance or market reach. Such CPUs would benefit from a software-oriented processor co-architecture.

Program code conversion methods and apparatus to facilitate such acceleration, translation and co-architecture capabilities are disclosed, for example, in published application WO00/22521, the disclosure of which is incorporated hereby by reference herein.

SUMMARY OF THE INVENTION

Performing program code conversion inevitably brings overheads in the conversion process, compared with native execution of the subject program on a subject processor.

The present invention is particularly concerned with program code conversion, whereby a subject program is translated into target code executable by a target processor in a target computing platform. Performing program code conversion inevitably brings overheads in the conversion process, compared with native execution of the subject program on a subject processor.

A library function is a section of code which is called by another program to perform a specific function. Many computing environments provide a standard set of library functions, e.g. as part of an operating system ("system libraries"). In other cases, one or more proprietary libraries are provided. When a subject program runs on a subject computing environment, control flow passes between the different units of subject code as function calls are made to these external subject libraries.

In some circumstances, native (i.e., target architecture) versions of certain subject libraries may be available on the target architecture. Hence, it is desired to utilise these native library functions where appropriate, instead of translating the subject library into target code. The use of native libraries in program code conversion is discussed in co-pending application U.S. Ser. No. 10/748,317 (see also WO2005/008478), the disclosure of which is incorporated herein by reference.

The inventors have identified that such native binding also brings disadvantages. For example, execution control is removed from the subject program and passes to the native code. It is then more difficult to control subsequent execution, such as the use of dependent sub-libraries. Also, opportunities for making optimisations may be lost. Further, an emulated subject state may become inaccurate.

According to the present invention there is provided an apparatus and method as set forth in the appended claims. Preferred features of the invention will be apparent from the dependent claims, and the description which follows.

The following is a summary of various aspects and advantages realizable according to embodiments of the invention. It is provided as an introduction to assist those skilled in the art to more rapidly assimilate the detailed design discussion that ensues and does not and is not intended in any way to limit the scope of the claims that are appended hereto.

In one aspect of the present invention there is provided a method of executing program code during conversion of subject code executable by a subject processor into target code executable by a target processor, wherein the target code is executable in combination with native code that is natively executable by the target processor, said method comprising: executing a first subject code portion on the target processor as translated target code; calling from the first subject code portion to execute a native code portion natively on the target processor; calling from the native code portion to execute a second subject code portion as translated target code; returning from execution of the second subject code portion to execution of the native code portion; returning from execution of the native code portion to execution of the first subject code portion.

In another aspect of the present invention there is provided a method of executing program code following conversion of subject code executable by a subject processor into target code executable by a target processor. In the method, the target code is executable in combination with native code that is natively executable by the target processor. The method includes providing at least first, second and third subject code portions, and at least a first native code portion; calling from execution of the first subject code portion to execute the first native code portion, such that the first native code portion is executed instead of executing a translated target code version of the second subject code portion; calling from execution of the first native code portion to execute a target code translated version of the third subject code portion; returning from execution of the target code translated version of the third subject code portion to execution of the first native code portion; and returning from execution of the first native code portion to execution of the first subject code portion.

In another aspect of the present invention there is provided a method of program code execution suitable for use with respect to conversion of subject code executable by a subject processor into target code executable by a target processor. In the method, the target code is executable in combination with native code that is natively executable by the target processor. The method includes providing at least first and second portions of subject code having corresponding first and second portions of native code, wherein the first native code portion comprises a link to the second native code portion; binding the first subject code portion to the first native code portion such that the first native code portion is executed instead of executing a target code translated version of the first subject code portion; and replacing the link in the first native code portion with a link to the second subject code portion, such that a target code translated version of the second subject code portion is executed instead of executing the second native code portion.

In the example embodiments, the inventors have developed methods directed at expediting program code conversion, which are particularly useful in connection with a run-time translator which provides dynamic binary translation of subject program code into target code.

The example embodiments of present invention improve performance when undertaking program code conversion. In particular, the example embodiments improve performance in relation to the use of native bound code in combination with translated target code. Further, embodiments of the present invention enable a translator to perform program code conversion from subject code to target code, and efficiently execute the target code in combination with portions of native code.

The present invention also extends to a translator apparatus having a translator unit having a translator unit arranged to perform any of the methods defined herein. Also, the present invention extends to computer-readable storage medium having recorded thereon instructions implementable by a computer to perform any of the methods defined herein.

DESCRIPTION OF THE DRAWINGS

The accompanying drawings, which are incorporated in and constitute a part of the specification, illustrate presently preferred implementations and are described as follows.

DETAILED DESCRIPTION

The following description is provided to enable a person skilled in the art to make and use the invention and sets forth the best modes contemplated by the inventors of carrying out their invention. Various modifications, however, will remain readily apparent to those skilled in the art, since the general principles of the present invention have been defined herein specifically to provide an improved program code conversion method and apparatus.

In the terminology below, a subject program is intended to execute on a subject computing platform including a subject processor. A target computing platform including a target processor is used to execute the subject program, through a translator which performs dynamic program code conversion. The translator performs code conversion from subject code to target code, such that the target code is executable on the target computing platform.

Figure 1:
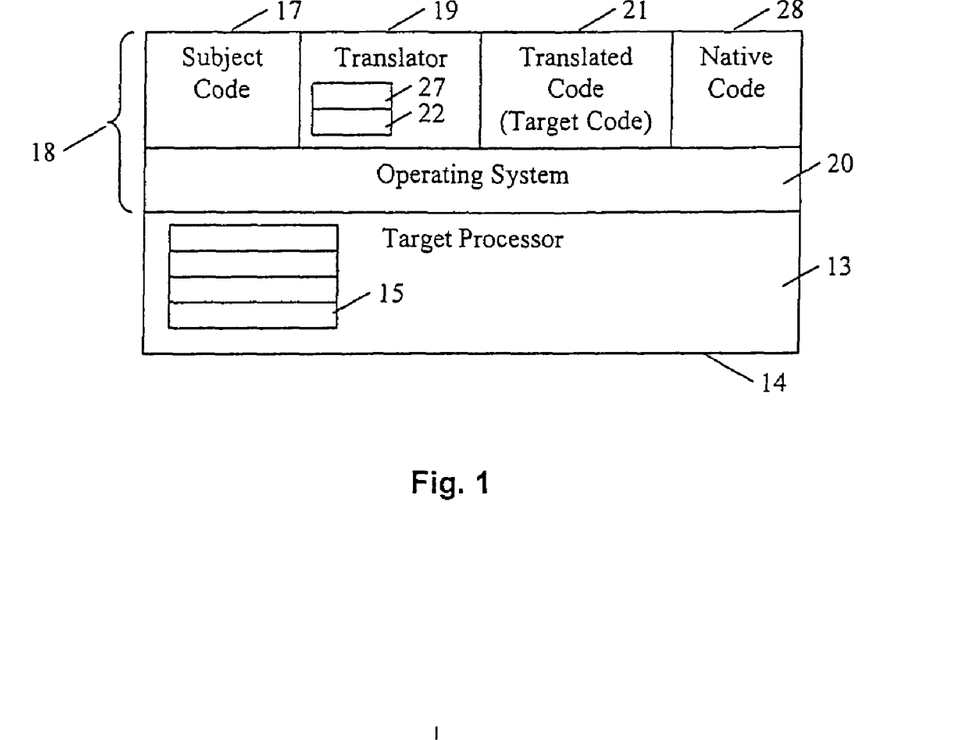
FIG. 1 is a block diagram illustrative of apparatus wherein embodiments of the invention find application.

FIG. 1 illustrates an example target computing platform architecture 14, comprising a target processor 13 including target registers 15 together with memory 18 storing a plurality of software components 17, 19, 20, 21, 22, 27 and 28. The software components include subject code 17 to be translated, an operating system 20, translator code 19, translated code (target code) 21, an abstract register bank 27, a native binding mechanism 22, and native code 28.

There is a distinction between "target code" 21, which results from the run-time translation of subject code 17, and "native code" 28, which is compiled directly for the target architecture. System target libraries provided by the target operating system 20 are an example of native code 28. By contrast, a translation of a subject system library is an example of target code 21. Native code 28 is generated external to the translator 19. This means that the translator 19 does not generate the native code 28. Also, the translator 19 does not have an opportunity to optimize the native code 28.

In one embodiment, the translator code 19 is an emulator to translate subject code of a subject instruction set architecture (ISA) into translated target code of another ISA, with or without optimisations. In another embodiment, the translator 19 functions as an accelerator for translating subject code into target code, each of the same ISA, by performing program code optimisations.

In general terms, the target computing platform 14 is a translator apparatus which includes, inter alia, a translator unit. In the example embodiment, the translator 19 is a compiled version of source code implementing the translator. The translator 19 and the translated code 21 produced by the translator 19 run in conjunction with the operating system 20 on the target processor 13, which is typically a microprocessor or other suitable computer.

It will be appreciated that the structure illustrated in FIG. 1 is exemplary only and that, for example, embodiments of the invention may be implemented in code residing within or beneath an operating system. The subject code 17, translator code 19, operating system 20, and storage mechanisms of the memory 18 may be any of a wide variety of types, as known to those skilled in the art.

In the apparatus according to FIG. 1, program code conversion is preferably performed dynamically, at run-time, while the target code 21 is running. The translator 19 runs inline with the translated program 21. The translator 19 is preferably employed as an application compiled for the target architecture. The subject program 17 is translated by the translator 19 at run-time to execute on the target architecture 14. The subject program 17 is translated by the translator 19 at run-time to execute directly on the target architecture. The translator 19 also transforms subject operating system (OS) calls made by the subject program 17 so that they work correctly when passed to the target OS 20.

Running the subject program 17 through the translator 19 involves two different types of code that execute in an interleaved manner: the translator code 19; and the target code 21. The translator code 19 is generated such as by a compiler, prior to run-time, based on a high-level source code implementation of the translator 19. By contrast, the target code 21 is generated by the translator code 19, throughout run-time, based on the stored subject code 17 of the program being translated.

The subject program 17 is intended to run on a subject processor (not shown). In one embodiment, the translator 19 functions as an emulator. That is, the translator 19 emulates the subject processor, whilst actually executing the subject program 17 as target code 21 on the target processor 13.

In the example embodiment, at least one global register store 27 is provided (also referred to as the subject register bank 27 or abstract register bank 27). In a multiprocessor environment, optionally more than one abstract register bank 27 is provided according to the architecture of the subject processor. A representation of a subject processor state is provided by components of the translator 19 and the target code 21. That is, the translator 19 stores the subject processor state in a variety of explicit programming language devices such as variables and/or objects. The compiler used to compile the translator 19 determines how the state and operations are implemented in the translator code. The target code 21, by comparison, provides subject processor state implicitly in the target registers 15 and in memory locations 18, which are manipulated by the target instructions of the target code 21. For example, the low-level representation of the global register store 27 is simply a region of allocated memory. In the source code of the translator 19, however, the global register store 27 is a data array or an object which can be accessed and manipulated at a higher level.

Figure 2:
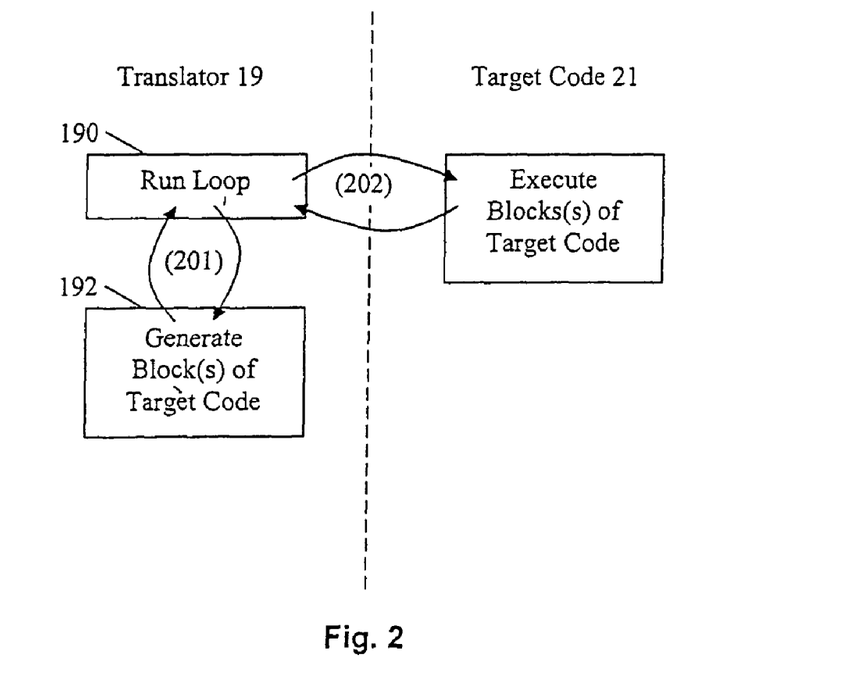
FIG. 2 is a schematic flow diagram illustrating an exemplary method of execution control during program code conversion.

FIG. 2 is a schematic flow diagram illustrating an example method of execution control during program code conversion.

As shown in FIG. 2, control initially resides with a translator control loop 190. In step 201, the control loop 190 calls a code generation function 192 of the translator code 19, which translates a block of the subject code 17 into a corresponding block of translated code 21. Then, in step 202, that block of translated target code 21 is executed on the target processor 13. Conveniently, the end of each block of translated target code 21 contains instructions to return control back to the control loop 201. In other words, the steps of translating and executing the subject code are interlaced, such that portions of the subject program 17 are translated and then executed in turn.

Here, the term "basic block" will be familiar to those skilled in the art. A basic block is a section of code with exactly one entry point and exactly one exit point, which limits the block of code to a single control path. For this reason, basic blocks are a useful fundamental unit of control flow. Suitably, the translator 19 divides the subject code 17 into a plurality of basic blocks, where each basic block is a sequential set of instructions between a first instruction at a single entry point and a last instruction at a single exit point (such as a jump, call or branch instruction). The translator may select just one of these basic blocks (block mode) or select a group of the basic blocks (group block mode). A group block suitably comprises two or more basic blocks which are to be treated together as a single unit. Further, the translator may form iso-blocks representing the same basic block of subject code but under different entry conditions.

In the example embodiments, trees of Intermediate Representation (IR) are generated based on a subject instruction sequence, as part of the process of generating the target code 21 from the original subject program 17. IR trees are abstract representations of the expressions calculated and operations performed by the subject program. Later, the target code 21 is generated based on the IR trees. Collections of IR nodes are actually directed acyclic graphs (DAGs), but are referred to colloquially as "trees".

As those skilled in the art may appreciate, in one embodiment the translator 19 is implemented using an object-oriented programming language such as C++. For example, an IR node is implemented as a C++ object, and references to other nodes are implemented as C++ references to the C++ objects corresponding to those other nodes. An IR tree is therefore implemented as a collection of IR node objects, containing various references to each other.

Further, in the embodiment under discussion, IR generation uses a set of abstract register definitions which correspond to specific features of the subject architecture upon which the subject program 17 is intended to run. For example, there is a unique abstract register definition for each physical register on the subject architecture ("subject register"). As such, abstract register definitions in the translator may be implemented as a C++ object which contains a reference to an IR node object (i.e., an IR tree). The aggregate of all IR trees referred to by the set of abstract register definitions is referred to as the working IR forest ("forest" because it contains multiple abstract register roots, each of which refers to an IR tree). These IR trees and other processes suitably form part of the translator code generation function 192.

Native Binding

Figure 3:
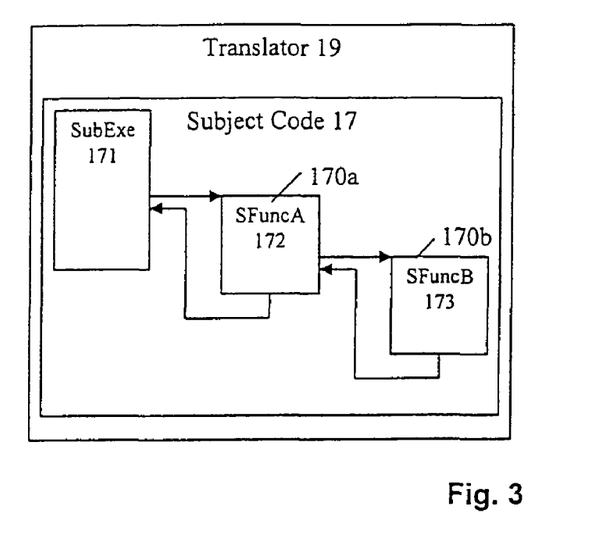
FIG. 3 is a schematic representation of an example subject program in the example translator.

FIG. 3 is an illustrative embodiment showing a plurality of compilation units 171, 172, 173 of a subject program 17 to be executed through the translator 19. In this example, a main subject executable 171 calls a function SFuncA 172 in a first library 170a. Execution of this first subject function SFuncA in turn calls a second subject function SFuncB 173 in a second library 170b. The arrows in FIG. 3 represent control flow between these different units of the subject program. As examples, the first library 170a is a proprietary library, whilst the second library 170b is a system library, or vice versa.

Although libraries have been shown in FIG. 3 for illustration, the subject code units 171, 172, 173 could be any suitable portion of subject code. When native binding is not employed, the units 171, 172, 173 of the subject program 17 are each translated into target code 21 and executed under the control of the translator 19.

Figure 4:
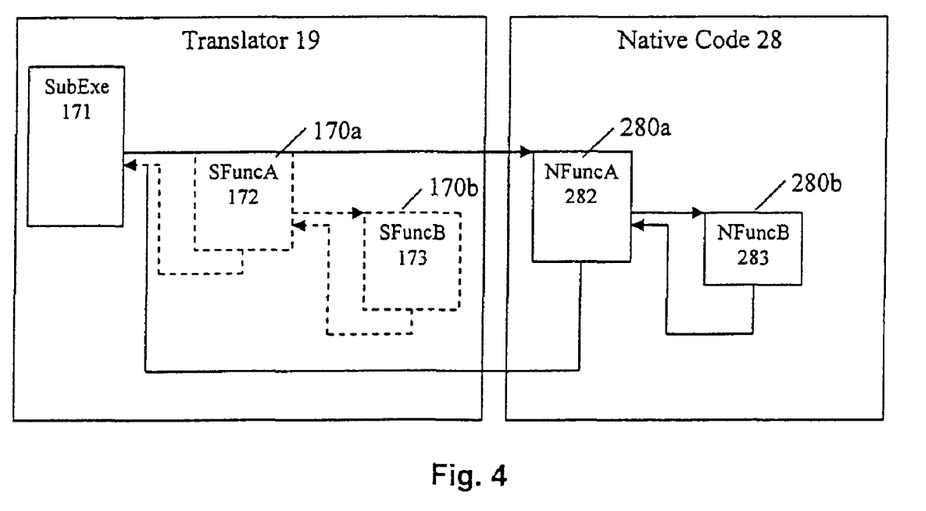
FIG. 4 is a schematic block diagram showing operational flow of an illustrative embodiment using native binding.

FIG. 4 illustrates a native binding mechanism as employed in example embodiments of the present invention. Here, the translator 19 uses native binding to replace calls in the subject program 17 to subject system library functions 172 with calls to equivalent functions in a native system library 280a. That is, the subject program 171 in effect calls instead to a section of native bound code 28. The translated target code version of the subject program 171 contains the call to the native bound code 28. In this case, the call is bound to a first native function NFuncA 282 in the first native library 280a.

As also shown in FIG. 4, in this illustrative example the first native function NFuncA calls in turn to a second native function NFuncB 283 in a second native library (i.e. a sub-library). That is, the ordinary expected execution sequence is for execution the second section of native bound code 283 to follow from execution of the first section of native bound code 282.

In an example MIPS-x86 translation, the x86 system target library "libc" may define an advanced memcpy( ) (memory copy) routine that takes advantage of SSE2 vector operations to perform extremely fast byte copies. Using the native binding mechanism 22, all calls to memcpy in the MIPS subject code are bound to the native memcpy( ). This eliminates the cost of translating the subject (MIPS) version of the memcpy( ) function. In addition, the native (x86) version of memcpy( ) function has a much greater awareness of the intricacies of the target hardware, so it is provided in the most efficient way to achieve the function's desired effect.

Native binding is implemented by the translator 19 when it is detected that the subject program's flow of control enters a section of subject code 17, such as a subject library, for which a native version of the subject code exists. Rather than translating the subject code 17, the translator 19 executes equivalent native code 28.

In addition to target system library calls, native binding may be used for more arbitrary code substitution, such as substituting a natively compiled version of a non-library function. Furthermore, native binding may be used to implement subject system calls on the target architecture, by replacing calls to subject system functions with substitute native functions that either implement the same functionality as the calls to subject system functions or act as call stubs around target system calls. Native binding may also be applied at arbitrary subject code locations, beyond function call sites, to allow arbitrary code sequences (in either target code or native code) and/or function calls to be inserted or substituted at any well-defined point in the subject program.

The native binding mechanism 22 allows the translator 19 to correlate particular subject code 17 functions with their native code 28 counterparts, so that the translator 19 knows which subject functions to bind, and which native functions to bind them to. The translator 19 can acquire this function mapping information in different ways depending on the implementation of native binding mechanism 22. Specific mechanisms to perform native binding include bind points, runtime symbol patching, and S-calls, as discussed in co-pending applications U.S. Ser. No. 10/748,317 and WO2005/008478.

Native binding enables translated subject code to execute a native (i.e., target architecture) version of a unit of code directly, rather than translating and executing the equivalent subject code, such as a native version of a library. This avoids the overhead of translating the subject versions of those libraries. In addition, the native version may be a much more efficient implementation of the same functionality, as the native version can exploit architectural features of the target architecture which the subject version is unaware of.

Whilst native binding brings advantages, there are also limitations. In particular, the native code 28 is not under direct control of the translator 19.

Executing the native code 28 does not update subject state held by the translator 19. For example, the native code 28 does not update the abstract register bank 27. Also, the native code does not take account of emulated subject memory allocation, such as stack and heap memory allocations, controlled by the translator 19.

Native code may call into one or more sub-libraries, in one or more levels. The translator 19 is unable to control the use of sub-libraries by the native code 282. In practice, sub-libraries are sometimes of the order of one hundred levels deep, taking execution control many levels away from the translator 19.

The translator 19 is not able to perform optimisations with respect to the native code 22. For example, the translator 19 may well be able to optimise code in the native code library, but this opportunity is lost by executing the native code 28 outside the control of the translator 19.

There are also limitations with respect to parameter transformation. For example, there are limitations such as with respect to floating point precision where the subject program 17, the translator 19 and the native code 28 do not all share equivalent floating point precision.

The example embodiments of the present invention provide improved mechanisms for use in the context of native binding, which address these and other disadvantages.

Reverse Binding

Figure 5:
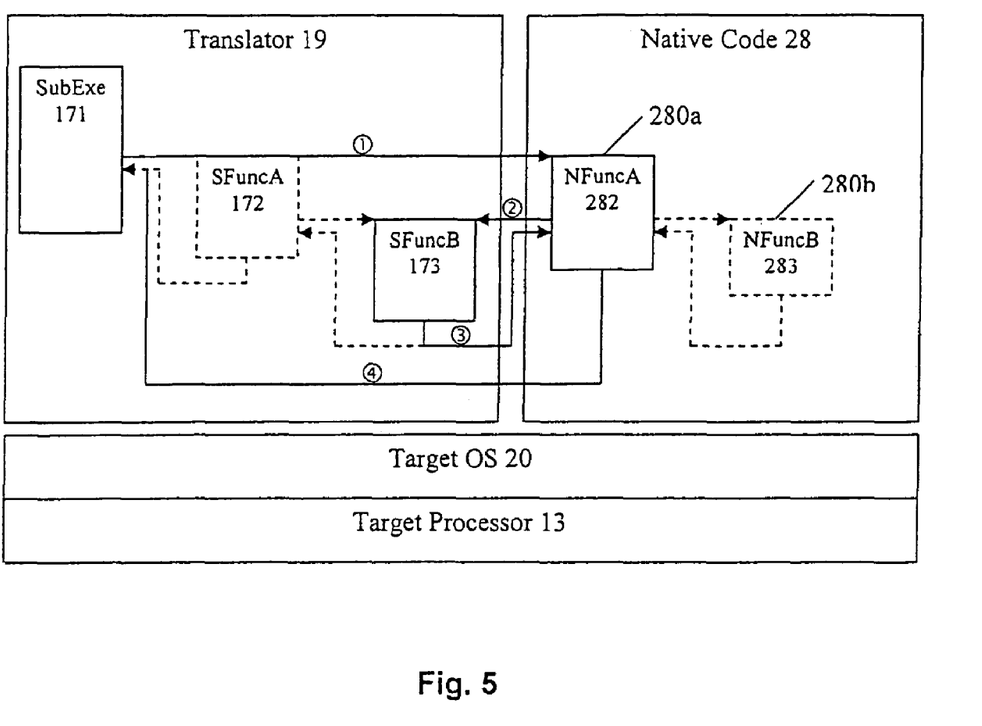
FIG. 5 is a schematic representation of an example reverse binding function.

FIG. 5 illustrates a reverse binding technique as employed in example embodiments of the present invention.

As shown in FIG. 5, the translator 19 is invoked part way through execution of the native code 28, and a portion of subject code 17 is executed. Control flow then returns to the bound native code 28. The reverse binding technique of FIG. 5 is a hybrid. In other words, a portion of subject code 17 is executed (through the translator 19) interleaved amongst portions of native code 28. In particular, the translator 19 is invoked to execute a portion of subject code 17 in place of, or in addition to, executing an expected next portion of native code 28.

In the illustrated example of FIG. 5, the main subject program 171 calls to the first native function NFuncA 282 at step ①, which is executed as native bound code. Then, at step ②, the subject code function SFuncB 173 is executed through the translator 19 as target code, instead of the second native function NFuncB 283. At step ③, control returns to the native code 28 to complete execution of NFuncA 282. Ultimately, at step ④, control returns to the main subject executable 171.

Figure 6:
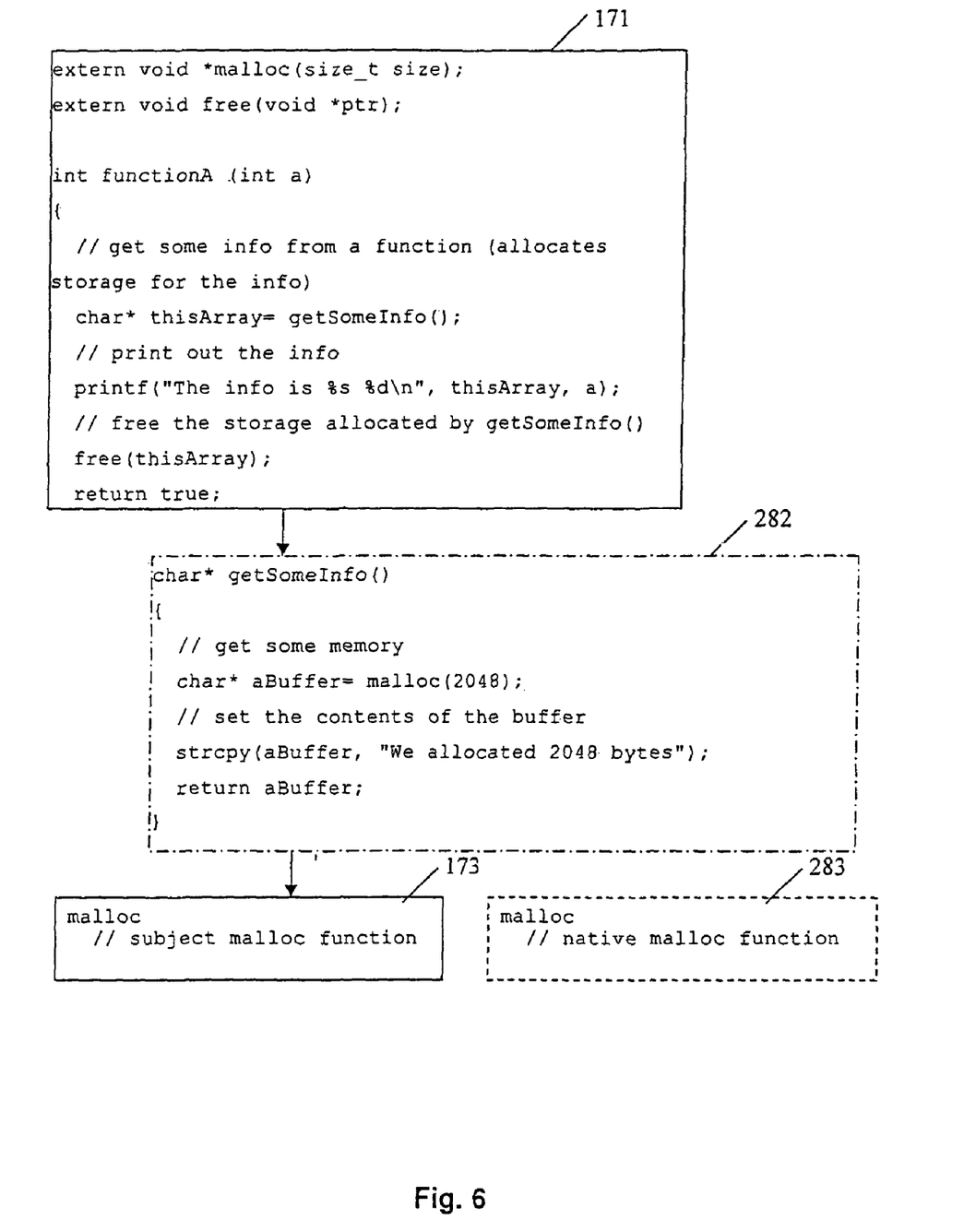
FIG. 6 is an example of program code including a native bound function and a reverse bound subject function.

FIG. 6 shows example sections of program code, to illustrate a practical situation where reverse binding is particularly helpful.

In this example, functionA 171 is subject code which is translated and executed as target code. The translator 19 native binds to a native code version of the function 'getSomeInfo' 282, which is executed as native code. This native function 'getSomeInfo' includes a call to a 'malloc' function which allocates an area of memory in order for the 'getSomeInfo' function to operate. However, this memory allocation happens to be freed by the functionA in the subject code. Executing the native version of the malloc function leads to a memory leak and a potential defect. That is, a problem arises in keeping memory allocations consistent between the subject code and the native code executions.

As shown in FIG. 6, in this example there is a reverse bind from the native code function 'getSomeInfo' 282 to a subject code version of the 'malloc' function 173. During execution of the native function 'getSomeInfo' 282, the call to the 'malloc' function results in the translator 19 being invoked. The translator 19 translates the subject 'malloc' function 172 into target code. The 'malloc' and the 'free' are now correctly paired in the emulated subject state held by the translator 19. The result of executing the subject 'malloc' function 173 is returned to the native 'getSomeInfo' function 282 to assign the storage representing a Buffer.

The example of FIG. 6 has been simplified for illustration. The reverse binding preferably occurs at many different sites in the native bound code, and may occur at many different sub-levels.

In a particular example embodiment, reverse binding is applied by substituting a link in the bound native code 28 with a link to a reverse bound section of subject code 17.

Figure 7:
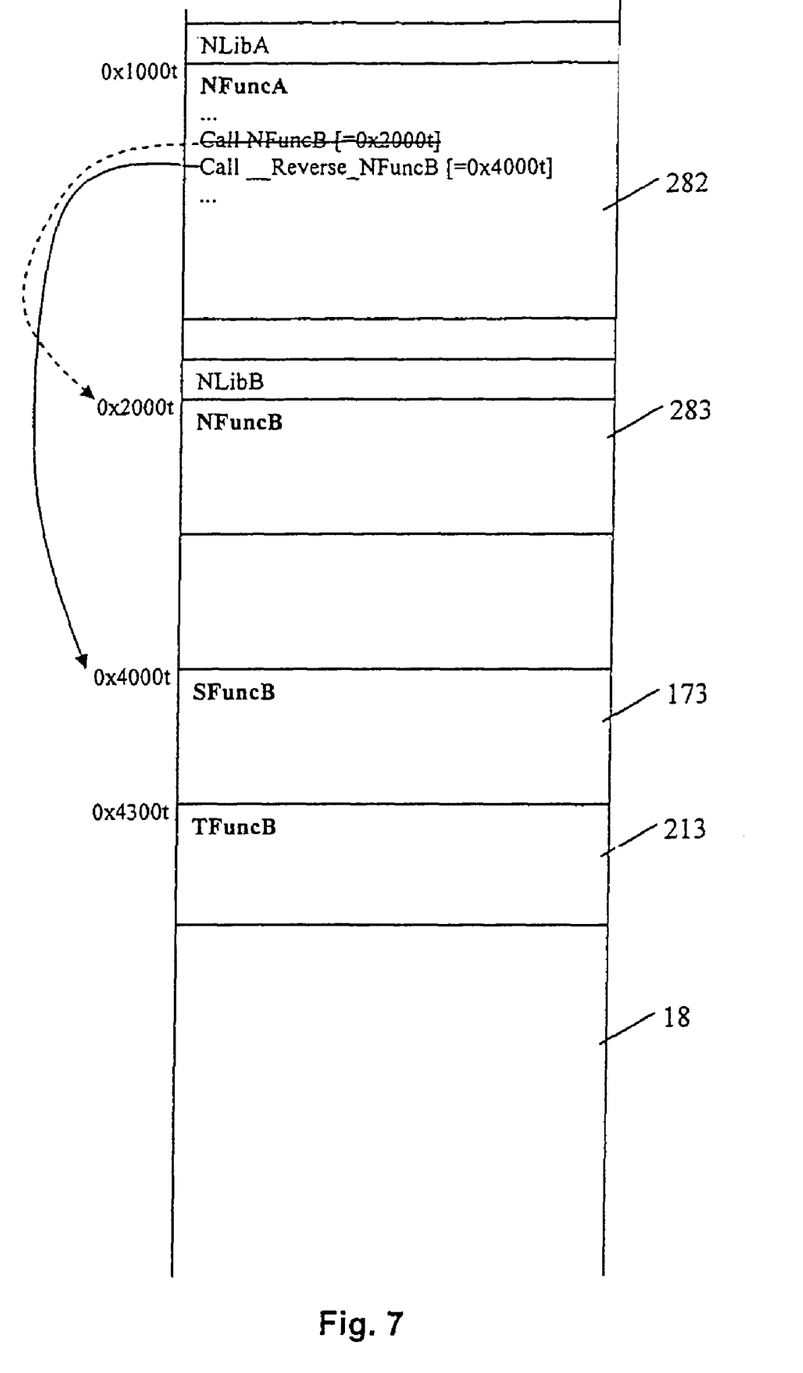
FIG. 7 is an example layout of memory in a target processor.

FIG. 7 illustrates an example memory re-addressing mechanism to perform reverse binding. FIG. 7 is a schematic representation of the memory 18 of the target processor 13, which stores native code sections 282, 283 and a subject code section 173, amongst others. In this case, like FIG. 5, native functions NFuncA 282 and NFuncB 283 are provided in first and second native libraries NLibA 280a and NLibB 280b, respectively. The first library NLibA 280a is hence dependent upon the second library NLibB 280b, and NLibB is a dependent of NLibA. In another embodiment, the first and second functions NFuncA 282 and NFuncB 283 are provided within a single library, but NFuncB is still a dependent of NFuncA.

Also, FIG. 7 shows target code 213 which has been generated by the translator 19 from the subject code 173. The target code 213 is executable on the target processor 13 in place of the subject code 173.

The target architecture will typically load a native library 280a and any dependents (e.g. library 280b) into the memory 18 upon demand, such as through a dynamic linker. However, in an example embodiment of the present invention, a native library 280a (and its dependents 280b) is loaded into the memory 18 upon initialisation of the translator 19. Whilst this consumes more memory, the benefit is that the native libraries 280a, 280b are more readily manipulable by the translator 19.

In one example, dependencies and symbols in a first native library (NLibA 280a) are resolved, and links in the first native library (280a) are substituted for links to functions in a subject library (173), to become a reverse bound subject function. In FIG. 7, the call to NFuncB from within NFuncA 282 is replaced with a call to _reverse_NFuncB. This substitute call is suitably inserted with a call stub in the native function library 282. The reverse call stub now leads to the subject function SFuncB 173, which is translated by the translator 19 and executed as target code with TFuncB 213.

The example mechanisms for implementing native binding and reverse binding will now be described in more detail.

Reverse Bind Points

In one embodiment, the native function to be bound is identified using a special purpose "reverse bind point" description language. A reverse bind point description includes: (a) the native function to be reverse bound and (b) the corresponding reverse bound subject function. The translator 19 reads the reverse bind point descriptions at the beginning of execution to identify reverse bind points (locations to invoke subject functions from native code).

During initialisation of the native library, when the translator 19 encounters these reverse bind points, the translator 19 inserts in the native code 28 a call stub to the appropriate subject function.

In one embodiment, particular reverse bind point descriptions are embedded in the translator 19. In another embodiment, reverse bind point descriptions are stored in separate files which the translator 19 reads at run-time, thus allowing end-users to control the reverse binding mechanism 22 by adding particular native-to-subject function mappings.

Modified Native Library

In a further embodiment, a translator-specific version of the native library is created in advance, having reverse bind points such as reverse call stubs embedded therein at compilation.

Parameter Transformations

When invoking a native function, the translator 19 conforms to the native calling conventions of the target architecture. By comparison, target code 21 does not necessarily need to adhere to the target architecture calling conventions, as long as the translator 19 adheres to some consistent calling convention throughout the target code 21. Hence, a first calling convention may apply when executing native code 28, and a second calling convention may apply when executing target code 21. In this case, a calling convention switch is implemented when moving between native code 28 and target code 21, or vice versa.

In addition, the translator 19 may need to perform data transformation between the target machine state (as represented in native code 28) and the subject machine state (as represented in target code 21), both for the input parameters and return values, if any, of a reverse bound subject function 173. Examples of such data transformations may include: (i) endian conversion (i.e., byte-swapping); (ii) data structure alignment; (iii) conversion between subject addresses and target addresses; and (iv) value transformation (e.g., constant conversion or value scaling).

For example, on the MIPS architecture, function parameters are passed in registers, while on the x86 architecture, parameters are passed on the stack. For a MIPS-x86 translator to invoke a native function, the x86 calling conventions require that function parameters be moved from the subject register bank 27 to the stack. Conversely, reverse binding to a subject MIPS function requires function parameters to be moved from the stack into the subject register bank 27.

Call Stubs

Invoking a reverse bound subject function 173 involves several steps, including: parameter setup; input parameter transformation; function invocation; and result transformation.

Parameter setup refers to the code which calculates the values of the function call parameters. Conveniently, the native code 28 calculates the parameter values regardless of whether the function is invoked as a native function 283 or as a reverse bound subject function 173.

Input parameter transformation organizes the function call parameter values, from their native code 28 representations, to the format and location that the subject function 173 expects.

Function invocation is the actual function call to the reverse bound subject function 173, and includes the organization of the (reformatted) parameters into the order required by a function prototype, in a manner complying with the calling conventions applied in the translator 19. The function prototype indicates the order and type of the function's parameters, and the type of the function's return value. For example, if the calling conventions applied by the translator require that arguments be passed on the stack, then the code which invokes a reverse bound subject function places the arguments on the subject stack in the correct order and advances the subject stack pointer accordingly.

Result transformation transforms the return values of the subject function, if any. The reverse bound subject function 173 will return a value in a format consistent with the subject architecture, which the translator 19 converts into the representation used by the native code 28.

"Parameter transformation" refers to all of the respective conversion between the different data formats and calling conventions of the target code 21 and native code 28. The code that performs parameter transformation is referred to as a "call stub," which includes a minimal wrapper around the underlying function call, whose purpose is to allow the native code caller 282 to interact with the subject code callee 173. A single "call stub" may therefore be divided into native code 28 and target code 21 components. Whether parameter transformation takes place entirely in target code 21 or in native code 28 depends on the implementation of reverse binding.

Native Code Reverse Call Stubs

Figure 8:
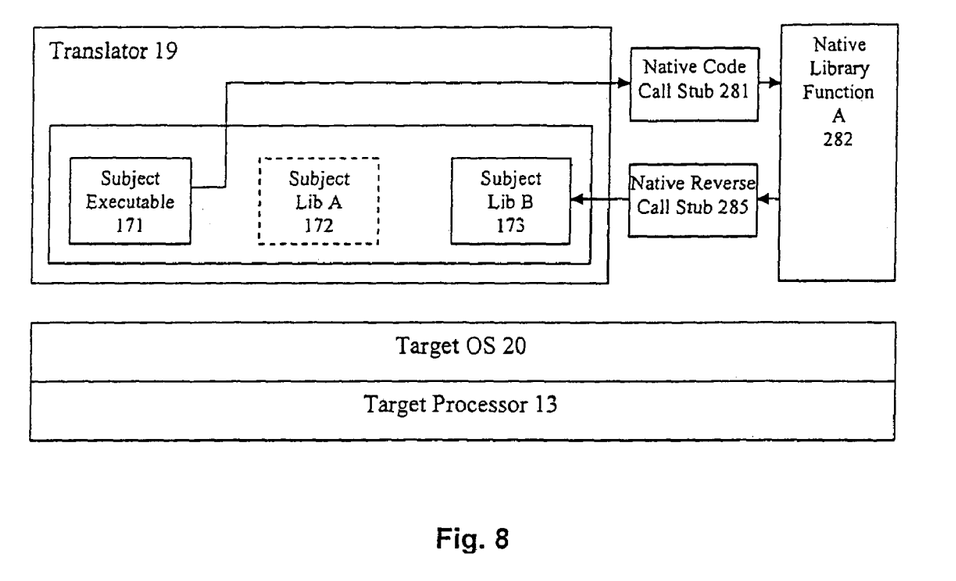
FIG. 8 shows a first example mechanism for native binding and reverse binding.

FIG. 8 shows an example implementation using call stubs 281, 285 implemented in native code. When calling from the subject code 171 into the native bound function A 282, a native code call stub 281 is used. Conversely, when calling from the bound native function A to the reverse bound subject function B 173, a native code reverse call stub 285 is employed. Within the bound native code 282, the translator 19 replaces calls to native library functions (e.g. a dependent library 283 as in FIG. 7) with calls to reverse call stubs 285. Here, the reverse call stubs 285 are written (in advance) in native code. Each reverse call stub 285 performs the parameter transformation discussed above, and calls the reverse bound subject function 173.

In one embodiment, parameter transformation is facilitated by defining a uniform reverse call stub function interface. A uniform call stub function interface defines a fixed function signature for all reverse call stubs and corresponding data types, which allows the translator 19 to plant the reverse call stub 281 without referring to the function signature (prototype) of the underlying subject function 173. This allows the reverse call stubs 285 to be implemented in a high-level programming language, such as C or C++, which makes the native binding and reverse binding mechanism more accessible to end users of the translator 19.

In a further embodiment, parameter transformation is facilitated by defining a bi-directional uniform call stub function interface. This call stub function interface defines a fixed function signature for all native bound function calls 211 and for all reverse bound function calls 282. As a result, the native binding and reverse binding mechanism is even more accessible to end users of the translator 19.

Target Code Call Stubs

Figure 9:
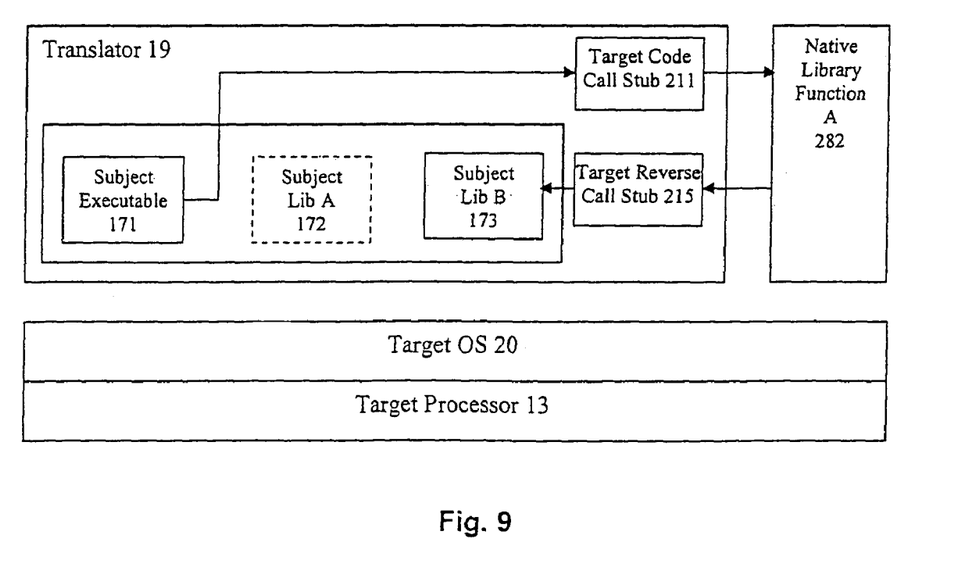
FIG. 9 shows another example mechanism for native binding and reverse binding.

FIG. 9 shows another example implementation, using a target code call stub 211 and a target code reverse call stub 215. Here, parameter transformation for native binding and reverse binding is performed entirely in target code 21. In this embodiment, the translator 19 detects native binding calls from the subject code 171 at decode-time and encodes the parameter transformations as IR trees (which are ultimately generated as target code). By representing the parameter transformations and details of the native function prototype in IR, the call stub code 211 becomes integrated into the subject code (i.e. IR of a call stub is indistinguishable from IR of subject code). This allows the translator to apply optimizations (e.g., group blocks) to the parameter transformation code. In contrast, parameter transformations performed in native code, such as the mapping of subject registers to function parameters performed in native code call stubs 211 (described above), are external to the translator 19 and cannot be readily optimized. Similarly, the reverse call stubs 215 are also provided in target code and optimisations are achieved within the translator 19.

The native code and target code call stubs 281, 285 and 211, 215 are suitably implemented in like pairs, but it is also possible to implement a mixed pair. That is, a native code call stub 281 is used with a target code reverse call stub 285, or vice versa.

As discussed above, the example embodiments of the present invention are primarily concerned with the substitution of a native function for a subject function (native binding) and vice versa (reverse binding). However, embodiments of the present invention also extend to more arbitrary substitutions and additions. In particular, reverse binding is suitably implemented by planting an additional reverse bound subject function call into a native code routine. Here, the additional subject function call temporarily returns execution control to the translator 19. As one example, the translator may then execute code such as to update emulated subject state, before returning control to the native code. As another example, the translator may apply profiling to dynamically select between invoking native bound code or translated subject code at a particular point in the subject program.

Context Re-Use

Figure 10:
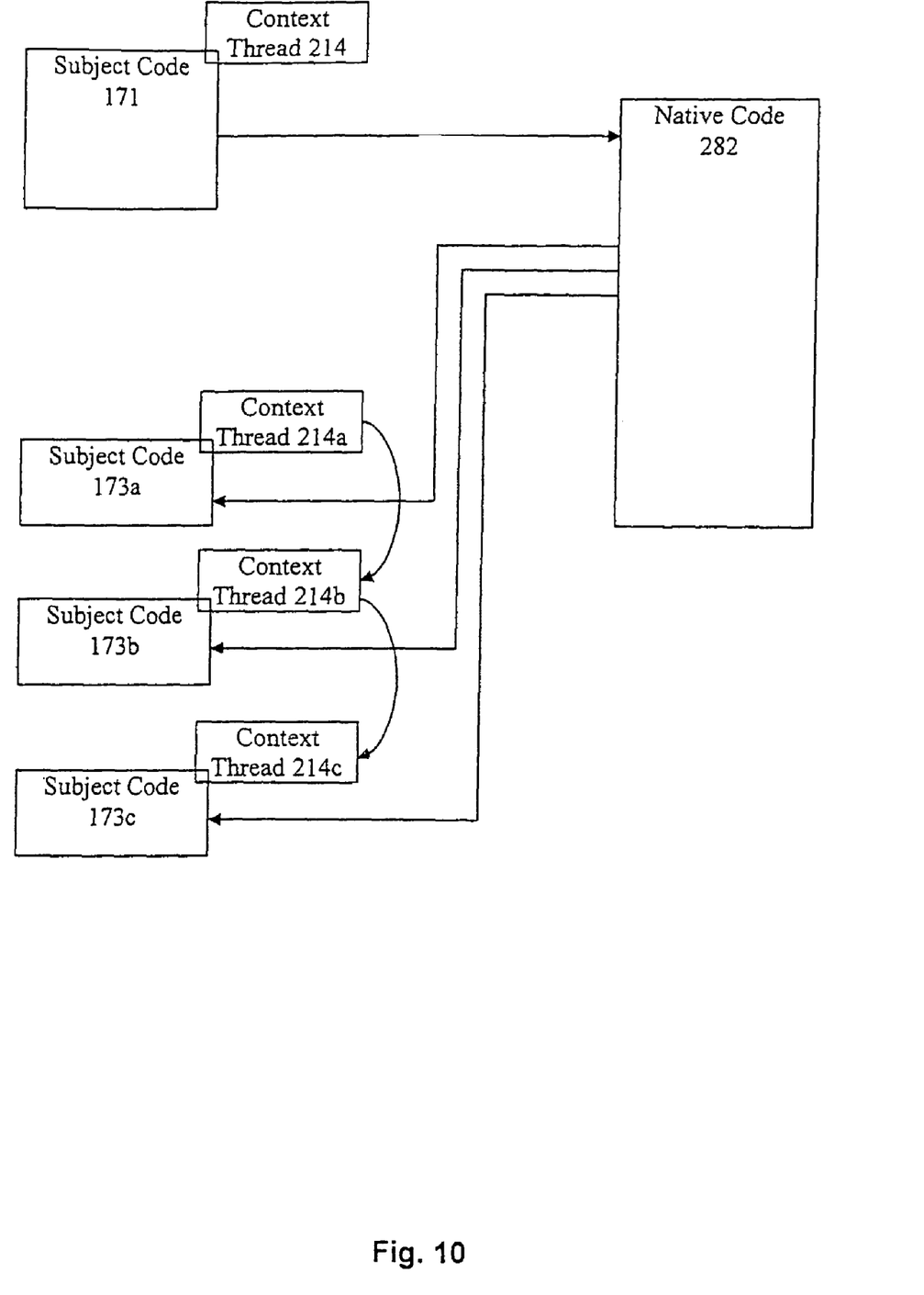
FIG. 10 shows an example mechanism for context reuse in a translator for program code conversion.

FIG. 10 illustrates a further aspect of the example embodiments of the present invention.

FIG. 10 is a schematic representation of a context thread 214. The context thread 214 is a datastructure which holds a diverse set of data, and allows the translator 19 to operate on multi-threaded programs. The example datastructure holds, inter alia, current values of the abstract register bank 27, the location of an emulated subject stack, the size of the emulated subject stack, a thread identifier, and translator-specific information about the translation of this subject thread.

A new context thread is created for each thread in a multi-threaded program. Also, a context thread is used for each reverse bound subject function 173. That is, each time a reverse bound function 173 is encountered, the translator 19 provides a context thread 214 as an environment in which to execute this thread.

Unfortunately, there is an overhead associated with the creation of each context thread. In particular, work is required to reserve a space for the context thread, and then populate the datastructure with appropriate values. Creation of a new context thread is relatively expensive.

In the example embodiment of the present invention, a single context thread is shared amongst a plurality of reverse bound subject functions. Most preferably, a single context thread datastructure 214a is created and then used for a first reverse bound subject function 173a, as shown in FIG. 10. When the subject function 173a is completed, the context thread 214a is stored and is not discarded. The datastructure remains in the memory 18.

As shown in FIG. 10, upon encountering a second reverse bound subject function 173b, the stored subject context is retrieved and reused. Here, the stored context thread 214a is retrieved and becomes the context thread 214b for the second reverse bound subject function 173b. This process is repeated, with the context thread 214b being stored and reused as the context thread 214c for the third reverse bound subject function 173c.

Each time the context thread is reused, it is repopulated with values appropriate to the respective subject function 173b, 173c. However, such repopulation is much less expensive than creating a brand new context thread. As a result, overhead in the translator 19 is significantly reduced.

The example embodiments discussed above have many advantages. For example, the translator is able to retain a measure of execution control, even when executing the native code 28, by reverse binding sections of the native code back into subject code in the translator. Further, executing reverse bound subject code updates the subject state held by the translator 19, such as the abstract register bank 27. Also, executing the reverse bound subject code allows the translator to update emulated subject memory allocation, such as stack and heap memory allocations. The translator is able to control the use of sub-libraries in the bound native code, by appropriate placing of reverse bindings. Level control is enabled, and the translator is able to perform optimisations. Parameter presentation is improved, such as by avoiding native code functions which do not share equivalent floating point precision with the subject code.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method of executing program code during conversion of subject code executable by a subject processor into target code executable by a target processor, in combination with native code that is natively executable by the target processor, said method comprising the steps of:
   executing a first subject code portion on the target processor as translated target code;
   calling from the first subject code portion to execute a native code portion natively on the target processor;
   dynamically determining whether to execute either a second subject code portion or a second native code portion when both the second subject code portion and the second native code portion are available to be executed, wherein the determining comprises determining if a reverse bind point description exists; and providing to a translator the reverse bind point description which includes (a) an identification of a native function of the second native code portion to be reverse bound, and (b) an identification of a subject function of the second subject code portion to be called in substitution for the native function;
   providing a link from the native code portion to the second native code portion if there is no reverse bind point description, or else providing a link from the native code portion to the second subject code portion by inserting in the native code portion a reverse call stub to the identified subject function of the second subject code portion when encountering the identified native function of the second native code portion;
   calling from the second native code portion to execute the second subject code portion as translated target code;
   returning from execution of the second subject code portion to execution of the second native code portion;
   returning from execution of the second native code portion to execution of the native code portion; and
   returning from execution of the native code portion to execution of the first subject code portion.

2. The method of claim 1, wherein the native code portion has an equivalent subject code portion, such that executing the native code portion is a substitute for executing the equivalent subject code portion.

3. The method of claim 1, wherein the second subject code portion replaces an equivalent native code portion, such that executing the second subject code portion is a substitute for executing the equivalent native code portion.

4. The method of claim 1, wherein the second subject code portion does not have an equivalent native code portion.

5. The method of claim 1, wherein executing the second subject code portion updates an emulated subject state held on the target processor to represent execution of the subject code in the subject processor.

6. The method of claim 1, wherein the second subject code portion provides a subject library function for execution in place of an equivalent native library function.

7. The method of claim 1, wherein the native code portion is a first native library function comprising a call to a dependent second native library function, and the method comprises replacing the call with a call to the second subject code portion.

8. The method of claim 7, further comprising the steps of:
   loading a native library into a memory of the target processor, the native library including at least first and second native functions, where the second native function is a dependent of the first native function;
   replacing a call in the native library to a memory location of the second native function with a call to a memory location associated with the second subject code portion.

9. The method of claim 8, further comprising the steps of: loading at least a first native library; resolving dependencies in the first native library and allocating memory locations for one or more dependent functions; and selectively replacing a call in the first native library to an allocated memory location for at least one of the one or more dependent functions with a call to a memory location associated with the second subject code portion.

10. The method of claim 1, comprising inserting the reverse call stub in the native code either before, after, or in place of a native function call.

11. The method of claim 1, further comprising embedding the reverse bind point description within a translator that performs the conversion from subject code to target code.

12. The method of claim 1, further comprising reading the reverse bind point description from a stored reverse bind point description file at a beginning of execution of a translator that performs the conversion from subject code to target code.

13. The method of claim 1, wherein the determining step further comprises providing a modified native library as the native code portion, wherein the modified native library is adapted for use with a translator that performs the conversion from subject code to target code, and further wherein the modified native library comprises the link from the native library to the second subject code portion.

14. The method of claim 1, wherein the native code portion provides a first native library function for execution in place of an equivalent subject library function, and the second subject code portion provides a subject library function for execution in place of an equivalent native library function, and the method further comprises the steps of:
   transforming zero or more first function parameters from a target code representation to a native code representation, and invoking the first native library function with the zero or more transformed first function parameters according to a prototype of the first native library function;
   transforming zero or more second function parameters from a native code representation to a subject code representation, and invoking the subject library function with the zero or more transformed second function parameter according to a prototype of the subject library function;
   transforming zero or more second return values of the invoked subject library function from a subject code representation to a native code representation, and returning to the first native library function; and transforming zero or more first return values of the invoked native function from a native code representation to a subject code representation, and returning to the first portion of subject code.

15. The method of claim 1, further comprising inserting a reverse call stub to call from the native code portion to the second subject code portion.

16. The method of claim 15, wherein the reverse call stub is provided in native code.

17. The method of claim 15, wherein the reverse call stub comprises target code generated by a translator which performs the conversion from subject code to target code.

18. The method of claim 17, further comprising:
integrating an intermediate representation of the reverse call stub into an intermediate representation forest for a block of subject code; and generating target code for the intermediate representation forest.

19. The method of claim 1, further comprising the steps of:
providing a context thread data structure for use in conversion from subject code to target code;
converting the second portion of subject code into the translated target code version, using the context thread data structure;
storing the context thread data structure in a memory of the target processor; and
upon encountering the second subject code portion for a second or subsequent time, reusing the stored context thread datastructure.

20. The method of claim 19, further comprising the steps of:
providing at least a third subject code portion to be executed by calling from the native code portion; and
sharing the stored context thread data structure for use when converting the third subject code portion into the target code.

21. The method of claim 19, wherein the context thread data structure provides at least a representation of an abstract register bank, a location of an emulated subject stack, a size of the emulated subject stack, a thread identifier, and translator-specific information about translation of the subject code portion.

22. A translator apparatus to perform program code conversion from subject code executable by a subject processor into target code executable by a target processor, in combination with native code that is natively executable by the target processor, said apparatus comprising:
a memory;
a processor coupled to the memory and operable to execute:
a first subject code portion,
a second subject code portion,
a first native code portion,
a second native code portion,
and a translator unit to translate the first subject code portion into translated target code for execution on the target processor, wherein the translated first subject code portion includes a call to execute the native code portion natively on the target processor comprising performing the following steps:
dynamically determining whether to execute either the second subject code portion or the second native code portion when both the second subject code portion and the second native code portion are available to be executed, wherein the determining comprises determining if a reverse bind point description exists; and
providing the reverse bind point description which includes (a) an identification of a native function of the second native code portion to be reverse bound, and (b) an identification of a subject function of the second subject code portion to be called in substitution for the native function;
providing a link from the native code portion to the second native code portion if there is no reverse bind point description, or else providing a link from the native code portion to the second subject code portion by inserting in the native code portion a reverse call stub to the identified subject function of the second subject code portion when encountering the identified native function of the second native code portion;
wherein the second native code portion includes a call to execute the second subject code portion as translated target code, such that execution of the second subject code portion returns to execution of the second native code portion, execution of the second native code portion returns to execution of the native code portion, and execution of the native code portion returns to execution of the first subject code portion.

23. The translator apparatus of claim 22, wherein the native code portion has an equivalent subject code portion, such that executing the native code portion is a substitute for executing the equivalent subject code portion.

24. The translator apparatus of claim 22, wherein the second subject code portion replaces an equivalent native code portion, such that executing the second subject code portion is a substitute for executing the equivalent native code portion.

25. The translator apparatus of claim 22, wherein the second subject code portion does not have an equivalent native code portion.

26. The translator apparatus of claim 22, wherein executing the second subject code portion updates an emulated subject state held on the target processor to represent execution of the subject code in the subject processor.

27. The translator apparatus of claim 22, wherein the second subject code portion provides a subject library function for execution in place of an equivalent native library function.

28. The translator apparatus of claim 22, wherein the native code portion is a first native library function comprising a call to a dependent second native library function, and the translator unit is arranged to replace the call with a call to the second subject code portion.

29. The translator apparatus of claim 28, wherein the translator unit is arranged to load a native library into a memory of the target processor, the native library including at least first and second native functions, where the second native function is a dependent of the first native function, and to replace a call in the native library to a memory location of the second native function with a call to a memory location associated with the second subject code portion.

30. The translator apparatus of claim 29, wherein the translator unit is arranged to load at least a first native library, resolve dependencies in the first native library and allocate memory locations for one or more dependent functions in one or more dependent libraries, and selectively replace a call in the first library to an allocated memory location of a dependent function with a call to a memory location associated with the second subject code portion.

31. The translator apparatus of claim 22, wherein the translator unit is arranged to insert the reverse call stub in the native code either before, after, or in place of a native function call.

32. The translator apparatus of claim 22, wherein the reverse bind point description is embedded within the translator apparatus.

33. The translator apparatus of claim 22, wherein the translator unit is arranged to read the reverse bind point description from a stored reverse bind point description file at a beginning of execution of the translator apparatus.

34. The translator apparatus of claim 22, wherein the translator unit is arranged to provide the a modified native library adapted for use with the translator apparatus containing the native code portion, and further wherein the modified native library comprises the link from the native library to the second subject code portion.

35. The translator apparatus of claim 22, wherein the native code portion comprises a first native library function for execution in place of an equivalent subject library function, and the second subject code portion comprises a subject library function for execution in place of an equivalent native library function, and wherein the translator unit is arranged to perform the steps of:
   transforming zero or more first function parameters from a target code representation to a native code representation, and invoking the first native library function with the zero or more transformed first function parameters according to a prototype of the first native library function;
   transforming zero or more second function parameters from a native code representation to a subject code representation, and invoking the subject library function with the zero or more transformed second function parameter according to a prototype of the subject library function;
   transforming zero or more second return values of the invoked subject library function from a subject code representation to a native code representation, and returning to the first native library function; and
   transforming zero or more first return values of the invoked native function from a native code representation to a subject code representation, and returning to the first portion of subject code.

36. The translator apparatus of claim 22, wherein the translator unit is arranged to insert a reverse call stub to call from the native code portion to the second subject code portion.

37. The translator apparatus of claim 36, wherein the reverse call stub is provided in native code.

38. The translator apparatus of claim 36, wherein the reverse call stub comprises target code generated by a translator which performs the conversion from subject code to target code.

39. The translator apparatus of claim 38, wherein the translator unit is arranged to:
   integrate an intermediate representation of the reverse call stub into an intermediate representation forest for a block of subject code; and
generate target code for the intermediate representation forest.

40. The translator apparatus of claim 22, wherein the translator unit is arranged to:
   provide a context thread data structure for use in conversion from subject code to target code;
   convert the second portion of subject code into the translated target code version, using the context thread data structure;
   store the context thread data structure in a memory of the target processor; and
   upon encountering the second subject code portion for a second or subsequent time, reuse the stored context thread data structure.

41. The translator apparatus of claim 40, wherein the translator unit is arranged to:
   provide at least a third subject code portion to be executed by calling from a native code portion; and
   share the stored context thread data structure for use when converting the third portion of subject code into the translated target code version.

42. The translator apparatus of claim 40, wherein the context thread data structure provides at least a representation of an abstract register bank, a location of an emulated subject stack, a size of the emulated subject stack, a thread identifier, and translator-specific information about translation of the subject code portion.

43. Computer readable storage having recorded thereon instructions implementable by a computer to perform a method of program code conversion from subject code executable by a subject processor into target code executable by a target processor, in combination with native code that is natively executable by the target processor, said method comprising:
   executing a first subject code portion on the target processor as translated target code;
      calling from the first subject code portion to execute a native code portion natively on the target processor;
      dynamically determining whether to execute either a second subject code portion or a second native code portion when both the second subject code portion and the second native code portion are available to be executed, wherein the determining comprises determining if a reverse bind point description exists; and
      providing to a translator the reverse bind point description which includes (a) an identification of a native function of the second native code portion to be reverse bound, and (b) an identification of a subject function of the second subject code portion to be called in substitution for the native function;
   providing a link from the native code portion to the second native code portion if there is no reverse bind point description, or else providing a link from the native code portion to the second subject code portion by inserting in the native code portion a reverse call stub to the identified subject function of the second subject code portion when encountering the identified native function of the second native code portion;
   calling from the second native code portion to execute the second subject code portion as translated target code;
   returning from execution of the second subject code portion to execution of the second native code portion;
   returning from execution of the second native code portion to execution of the native code portion; and
   returning from execution of the native code portion to execution of the first subject code portion.

* * * * *